(12) United States Patent
Hoffman et al.

(10) Patent No.: US 9,347,481 B2
(45) Date of Patent: May 24, 2016

(54) METHOD OF ATTACHING A NUT TO A PANEL

(71) Applicant: Whitesell International Corporation, Taylor, MI (US)

(72) Inventors: Randy M. Hoffman, South Lyon, MI (US); Patrick Bolick, Taylor, MI (US)

(73) Assignee: Whitesell International Corporation, Taylor, MI (US)

( * ) Notice: Subject to any disclaimer, the term of this patent is extended or adjusted under 35 U.S.C. 154(b) by 173 days.

(21) Appl. No.: 13/967,310

(22) Filed: Aug. 14, 2013

(65) Prior Publication Data

US 2015/0047171 A1 Feb. 19, 2015

(51) Int. Cl.
*B23P 11/00* (2006.01)
*F16B 37/06* (2006.01)
*F16B 33/00* (2006.01)

(52) U.S. Cl.
CPC ............. *F16B 37/068* (2013.01); *F16B 33/004* (2013.01); *Y10T 29/49826* (2015.01); *Y10T 29/49833* (2015.01); *Y10T 29/49835* (2015.01); *Y10T 29/49956* (2015.01); *Y10T 29/49963* (2015.01); *Y10T 29/49966* (2015.01)

(58) Field of Classification Search
CPC ............. F16B 37/068; F16B 2037/007; Y10T 29/49833; Y10T 29/49835; Y10T 29/49837; Y10T 29/49947; Y10T 29/49948; Y10T 29/49956; Y10T 29/49963; Y10T 29/49966
USPC ........... 411/180, 82, 82.1, 101, 132, 548, 116
See application file for complete search history.

(56) References Cited

U.S. PATENT DOCUMENTS

| | | | |
|---|---|---|---|
| 1,757,143 A | 5/1930 | Renner | |
| 2,583,868 A * | 1/1952 | Mociun | B23K 11/0053 219/107 |
| 2,775,917 A * | 1/1957 | Ferguson | 411/527 |
| 2,826,222 A * | 3/1958 | Case | B65D 59/02 138/96 R |
| 3,264,699 A * | 8/1966 | Knowlton | 24/305 |
| 4,325,178 A * | 4/1982 | Pruehs | 29/458 |
| 4,396,326 A * | 8/1983 | McKinnie et al. | 411/103 |
| 4,484,385 A | 11/1984 | Woods | |
| 4,630,363 A | 12/1986 | Woods | |
| 4,900,206 A * | 2/1990 | Kazino | F16B 37/06 411/377 |
| 5,336,255 A * | 8/1994 | Kanare | A61N 1/0452 607/112 |
| 5,979,035 A | 11/1999 | Tahara et al. | |
| 6,305,201 B1 * | 10/2001 | Ghiran et al. | 72/55 |
| 6,658,908 B1 | 12/2003 | Ghiran et al. | |
| 7,685,690 B2 | 3/2010 | Ghiran et al. | |
| 7,775,754 B2 * | 8/2010 | Calandra | F16B 13/143 405/259.1 |
| 8,337,130 B2 * | 12/2012 | Nagayama | F16B 37/065 411/179 |
| 2009/0038137 A1* | 2/2009 | Hassenzahl | 29/432.1 |
| 2010/0304213 A1* | 12/2010 | Breimon et al. | 429/185 |
| 2012/0288345 A1* | 11/2012 | Nagayama | F16B 37/065 411/374 |
| 2015/0047175 A1* | 2/2015 | Hoffman et al. | 29/432.2 |

FOREIGN PATENT DOCUMENTS

| | | | | |
|---|---|---|---|---|
| EP | 1533054 A2 * | 5/2005 | | B21J 15/02 |
| GB | 2092694 A * | 8/1982 | | F16B 37/14 |

* cited by examiner

*Primary Examiner* — Essama Omgba
(74) *Attorney, Agent, or Firm* — Dierker & Kavanaugh, P.C.

(57) ABSTRACT

A method of attaching a nut to a panel includes forming an aperture in a sheet metal panel by lancing a tab from the sheet metal panel. A root of the tab remains attached to the panel. The method further includes pressing a self-attaching nut into the aperture to attach the self-attaching nut to the sheet metal panel. The tab is bent to substantially prevent material from entering a bore of the nut from a blind side of the panel.

8 Claims, 5 Drawing Sheets

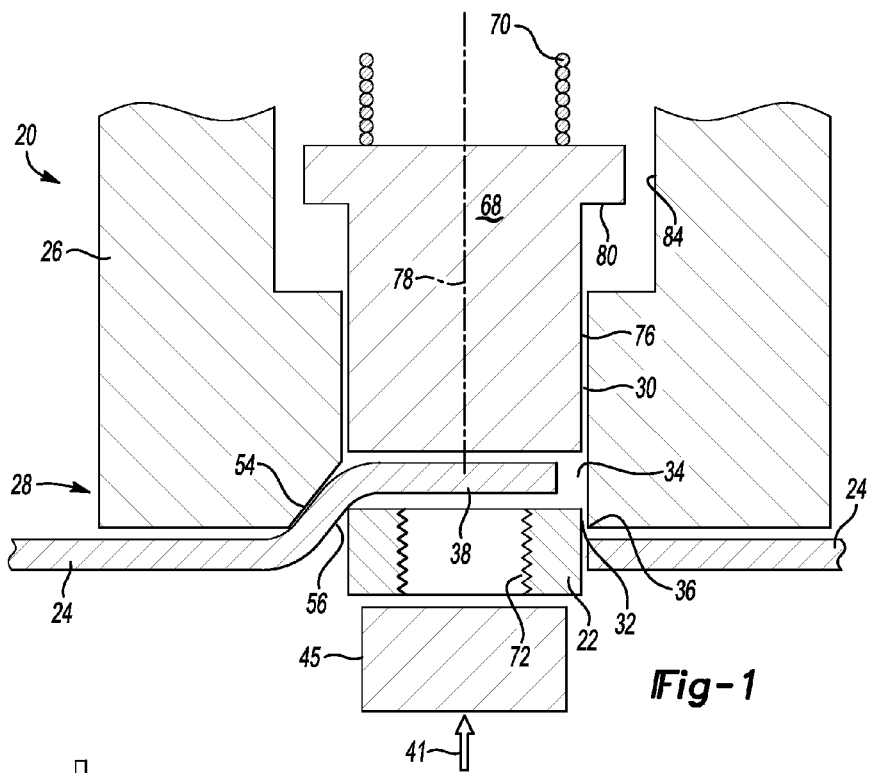
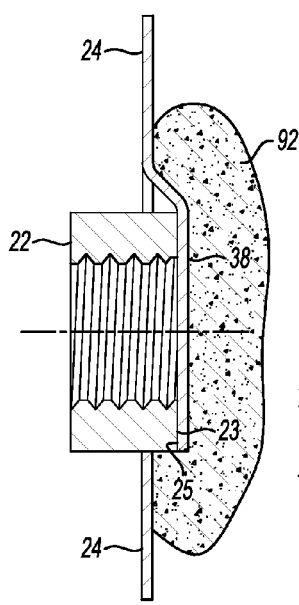
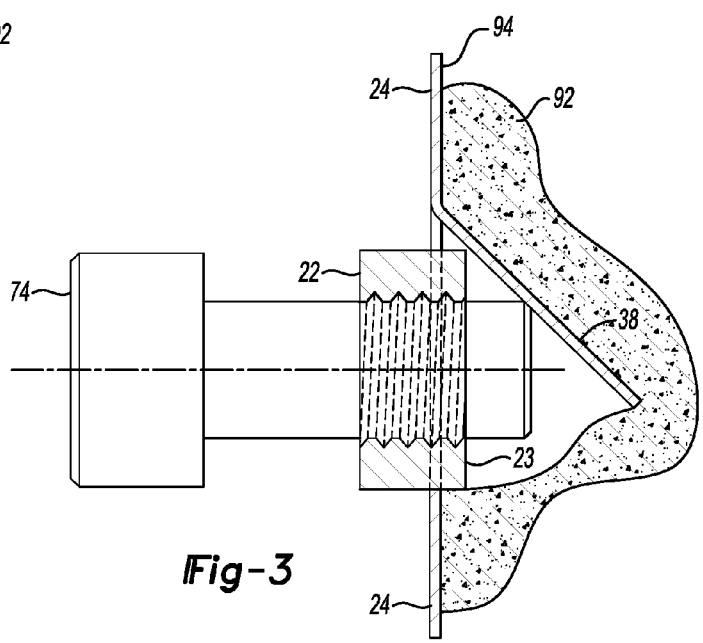

METHOD OF ATTACHING A NUT TO A PANEL

BACKGROUND

A self-attaching nut may be installed in a panel by a press. The press may include a die member or die button in a lower die platen and a plunger of an installation head in an upper die platen to drive a pierce nut into the panel. In cooperation with the die button, the pierce nut severs a slug from the panel and the nut is permanently affixed to the panel by engagement between the panel and the nut.

SUMMARY

A method of attaching a nut to a panel includes forming an aperture in a sheet metal panel by lancing a tab from the sheet metal panel. A root of the tab remains attached to the panel. The method further includes pressing a self-attaching nut into the aperture to attach the self-attaching nut to the sheet metal panel. The tab is bent to substantially prevent material from entering a bore of the nut from a blind side of the panel.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a semi-schematic cutaway, side cross-sectional view of an example of a nut installed in a panel in a press according to the present disclosure;

FIG. 2 is a cross-sectional view of an example of a nut installed in a panel according to the present disclosure;

FIG. 3 is a semi-schematic diagram of FIG. 2 with a complementary fastener installed in the nut and deflecting the tab portion according to the present disclosure;

DETAILED DESCRIPTION

Figure 4:
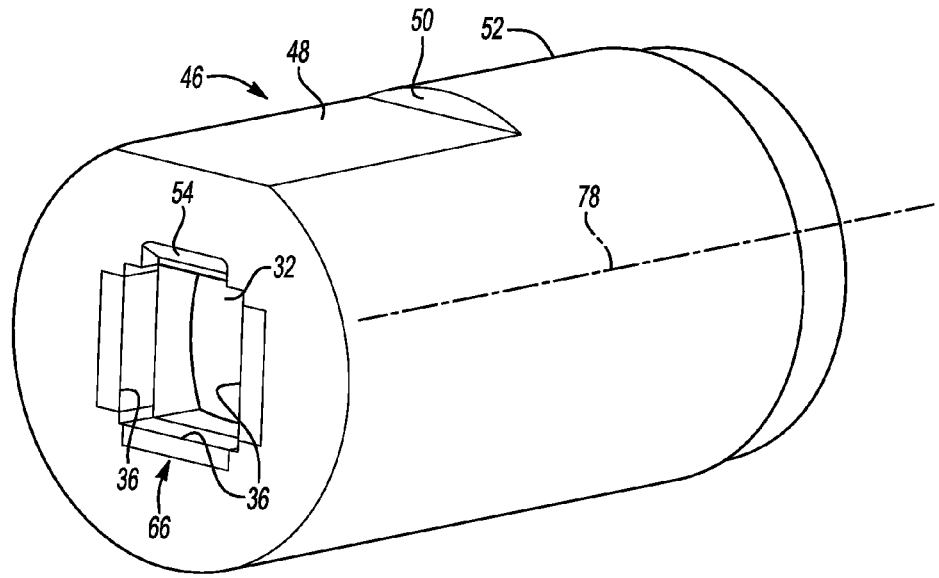
FIG. 4 is a semi-schematic perspective view of an example of a die button according to the present disclosure.

The present disclosure relates generally to a die button for installation of a nut to a panel. Examples of the present disclosure provide for a portion of the panel to substantially seal a bore of the nut.

Examples according to the present disclosure relate to installation of a nut in a panel, creating a temporary seal of a bore of the nut by covering the bore with a portion of the panel on a blind side of the panel. The present disclosure may allow materials such as foam, insulation, etc. to be injected or otherwise applied to the panel on the sealed side, substantially preventing the applied materials from extruding or leaking out through the bore or thread cylinder of the nut.

Examples according to the present disclosure may be used for light load-bearing applications. For example, in a refrigerator or other household appliance, foam insulation may be injected into a cavity on a blind side of a panel. Examples of the present disclosure may protect the bore of the nut from becoming fouled with the foam insulation without requiring the installation of a separate plug in the nut.

Further, since the tab portion remains attached to the panel, there is no need to recover a slug that may rattle in the cavity on the blind side of the panel. As used herein, the blind side of the panel is a side of the panel opposite to the side from which a complementary fastener is screwed into the nut.

Some pierce nuts may seal the perimeter of a pierce nut (i.e., around the exterior/periphery of the pierce nut) but not the bore (i.e., not the opening in a nut for receiving a complementary fastener). Examples according to the present disclosure seal the bore of a nut from materials that may otherwise be able to pass through.

Examples of the present disclosure include pressing a pilot feature of the nut into a sheet metal panel to lance a tab from the panel. The panel is lanced rather than pierced, and thus a slug of the panel material is not separated from the panel, but is still attached, thereby forming the tab. Lancing is a shearing operation that cuts an interior section of the sheet metal without entirely removing the section. In an example, a lancing operation leaves an opened metal tab. Further, the attached tab may be forced back against the pilot feature of the nut to cover the bore or threaded hole of the nut, substantially sealing the bore or threaded hole. The sealing of the bore or threaded hole substantially prevents materials from passing through the bore prior to a complementary fastener being installed in the nut.

The nut used with examples according to the present disclosure may be self-attaching (e.g., a pierce nut). The nut may have a threaded bore (as shown, e.g., in FIG. 1) to receive a threaded bolt or male fastener, or may have an unthreaded bore to receive a self-tapping or thread rolling male fastener. It is to be understood that threads shown in the figures are semi-schematic. Where left hand or right hand threads are shown in the figures, threads in the opposite direction may be used.

Referring now particularly to FIG. 1, an example according to the present disclosure including a die button 20 for installation of a nut 22 to a panel 24 is shown. The die button 20 may include a button body 26 having a panel end 28 adjacent to the panel 24. A cavity 30 may be defined in the button body 26, and an aperture 32 may be defined in the panel end 28 at a mouth 34 of the cavity 30. A shearing edge 36 may be disposed at a perimeter of the aperture 32 to shear a tab portion 38 from the panel 24 when a shearing force is applied to the panel 24 by the nut 22 driven by a punch 45 of a press 41. A relief 54 may be defined in a portion of the perimeter of the aperture 32 to bend a root portion 56 of the panel 24 connecting the tab portion 38 to the panel 24 without severing the root portion 56 when the nut 22 applies the shearing force to the panel 24.

According to the present disclosure, the shearing edge 36 is sharp enough to cooperate with the nut 22 to cut the panel 24. For example, a cross-section of the shearing edge 36 taken perpendicular to the aperture 32 may have a maximum radius of about 1.0 millimeter. The shearing edge 36 is to contact the nut 22 or to be spaced from the panel 24 at a maximum distance of one-tenth of the thickness of the panel 24 when the nut 22 is in an installed position in the panel 24.

The die button 20 may further include a reaction member 68. The reaction member 68 may be slidably disposed within the cavity 30. A resilient member 70 may be disposed within the cavity 30 to urge the reaction member 68 toward the panel end 28, thereby bending the tab portion 38 to substantially contact the nut 22 and substantially sealing the bore 72 of the nut 22. In an example, the resilient member 70 may be a helical spring, a stack of Belleville springs (not shown), a gas spring (not shown), or any other resilient element.

The reaction member 68 may include a reaction member body 76 having a shape complementary to the cavity 30 to slide through the cavity 30 along a longitudinal axis 78 of the button body 26. The reaction member 68 may further include a flange 80 extending from a surface of the reaction member body 76 disposed perpendicular to the longitudinal axis 78. The flange 80 may be urged by the resilient member 70 into contact with a protrusion 82 from a wall 84 of the cavity 30 to block ejection of the reaction member 68 through the mouth 34 from the button body 26. The flange 80 may contact the resilient member 70 and receive a force urging the reaction member 68 toward the mouth 34 of the cavity 30.

FIG. 2 is a cross-sectional view of an example of a nut 22 installed in a panel 24 according to the present disclosure. The tab portion 38 may substantially form a face seal 25 with a penetrating face 23 of the nut 22. The face seal 25 may substantially prevent material 92 from entering the bore 72 of the nut 22 from the blind side 94 of the panel 24. It is to be understood that the material 92 may be installed after the face seal 25 is formed, and the material 92 is not necessarily present during the formation of the tab portion 38. The tab portion 38 may be deflectable away from the substantial contact with the nut 22 by screwing a complementary fastener 74 through the bore 72 of the nut 22. An example complementary fastener 74 is shown in FIG. 3 to displace the tab portion 38 away from the nut 22. In the example depicted in FIG. 3, the tab portion 38 deflects a portion of the material 92 away from the penetrating face 23 of the nut 22. It is to be understood that the material 92 may slowly flow adjacent to the penetrating face 23 and to the portion of the complementary fastener 74 that protrudes through the nut 22 on the blind side 94 of the panel 24 without entering the bore 72 of the nut 22, which has been filled with the complementary fastener 74.

FIG. 4 is a semi-schematic perspective view of an example of die button 20 according to the present disclosure. In the example depicted in FIG. 4, the button body 26 has a cylindrical outer surface 52. An external feature 46 may be defined in the cylindrical outer surface 52 of the button body 26 for locating and aligning the die button 20 in a complementary socket of a retainer of a die machine (not shown). The example of the external feature 46 shown in FIG. 4 is a flat 48 normal to a radial line extending from the longitudinal axis 78 of the button body 26. The flat 48 may cooperate with the complementary socket of the retainer of the die machine (not shown) to prevent rotation of the die button 20 relative to the nut 22 (see FIG. 1) that will be pressed into the cavity 30 in alignment with the shearing edge 36. The external feature 46 may also include a shoulder 50 extending from the flat 48 to the outer surface 52 of the die button 20 to cooperate with the complementary socket of the retainer of the die machine (not shown) to selectively fix an axial location of die button 20 relative to the die machine (not shown).

Still referring to FIG. 4, the aperture 32 may be a square having four sides with the relief 54 along one of the four sides of the square as shown. The shearing edge 36 may be a plurality of shearing edges along another three sides of the square connected to the one of the four sides of the square with the relief 54 thereon. The shearing edge 36 may be formed from the same piece of material as the button body 26, and the shearing edge 36 may be hardened. In an example, induction hardening may be used to harden the shearing edge 36. The shearing edge 36 may include a hardened insert 66 formed from a piece of material separate from the button body 26 and fixedly attached to the button body 26. The hardened insert 66 may include carbide or a tool steel, e.g., UNS (Unified Numbering System) M2 or M4.

Although the aperture 32 shown in FIG. 4 is substantially square, the aperture 32 may define any suitable shape. For example, the aperture 32 may form any polygon that is complementary to the nut 22, and the relief 54 may be defined along one of the sides of the polygon. In another example, the aperture 32 may be substantially round in shape with a relief 54 formed in a portion of the perimeter of the aperture 32, and the nut 22 may be a round, self-attaching pierce nut (not shown).

Figure 5:
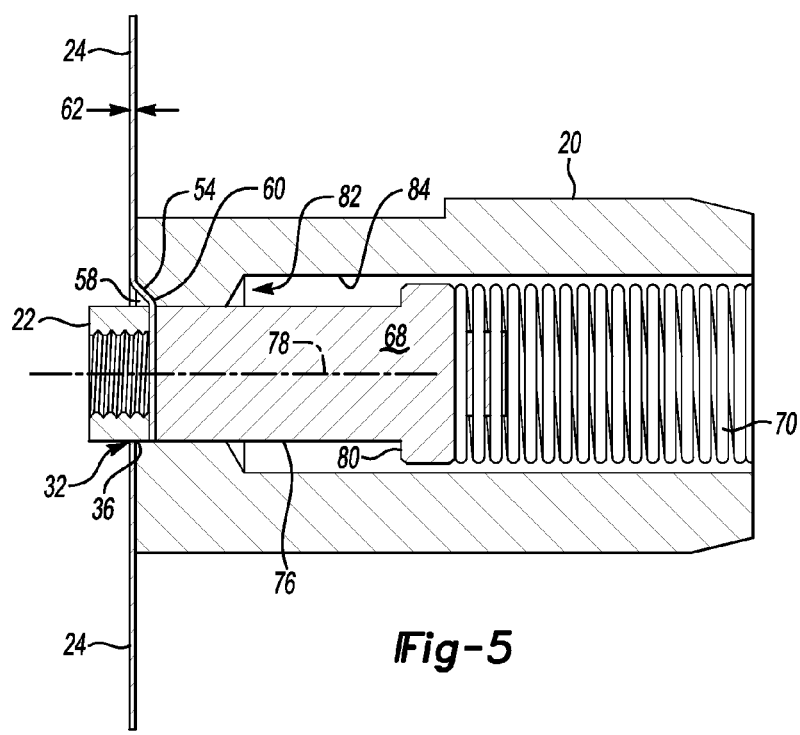
FIG. 5 is a cross-sectional view of an example of a die button engaging a panel and nut according to the present disclosure.

FIG. 5 is a cross-sectional view of an example of a die button 20 engaging a panel 24 and nut 22 according to the present disclosure. The relief 54 may define a volume 58 between the nut 22 and the relief 54. The relief 54 may be spaced from the nut 22 by at least a thickness 62 of the panel 24 when the nut 22 is at an installed position in the panel 24. Without being held to any theory, it is believed that when the relief 54 is spaced by a distance at least equal to the thickness 62 of the panel 24, the panel 24 will not be sheared in the volume 58, thereby leaving the tab portion 38 attached to the panel 24 at the root portion 56.

Figure 6:
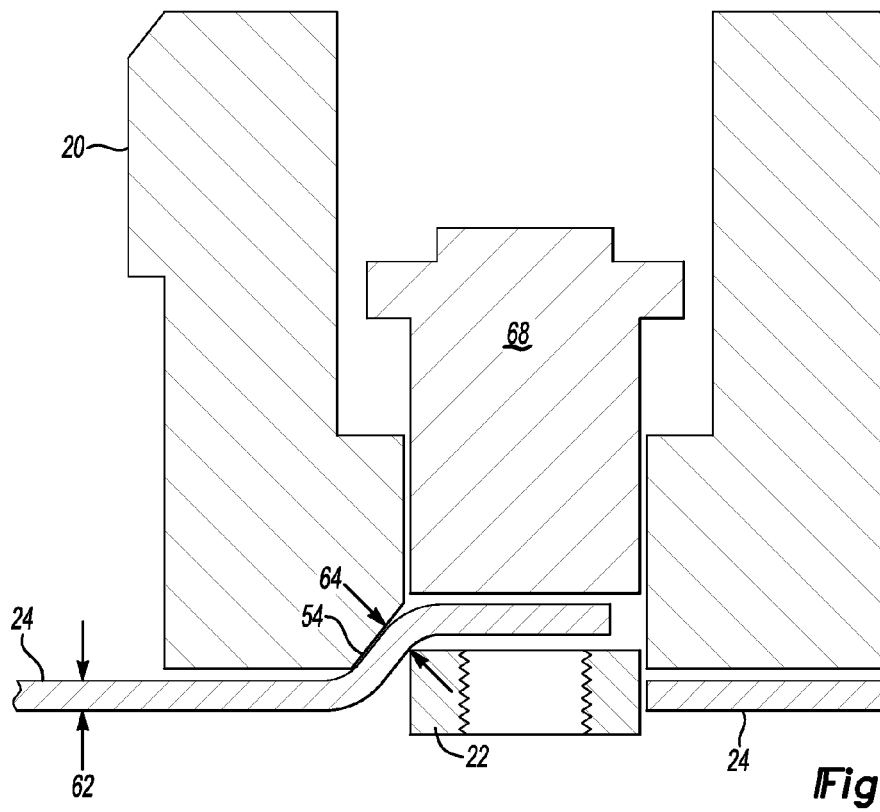
FIG. 6 is an enlarged cross-sectional view of an example of a die button engaging a panel and nut according to the present disclosure.

FIG. 6 is an enlarged cross-sectional view of an example die button 20 engaging a panel 24 and nut 22 according to the present disclosure. In the example depicted in FIG. 6, the nut 22 is shown in an installed position in the panel 24. It is to be understood that a gap 64 between the nut 22 and the panel 24 may be defined as the shortest distance between the nut 22 and the die button 20 within the cross-section depicted in FIG. 6. The gap 64 between the nut 22 and the relief 54 is larger than the panel thickness 62.

Examples according to the present disclosure may include nuts that vary in size. For example, nuts ranging in size from about M4 to about M16 may be used. It is to be understood that the bore 72 of the nut 22 is substantially sealed by the tab portion 38 of the panel 24 in the installed condition (i.e., after deformation of the tab portion 38 from contact with the die button 20 and reaction member 68).

Figure 7A:
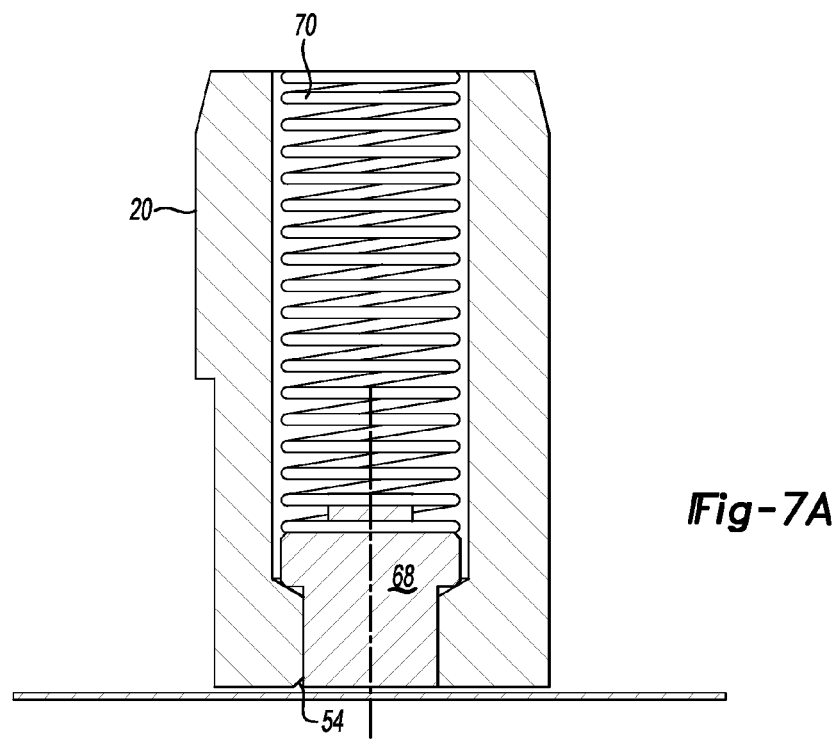
FIGS. 7A-7D are semi-schematic diagrams depicting cutaway views of a portion of an example of a die button according to the present disclosure.
Figure 7B:
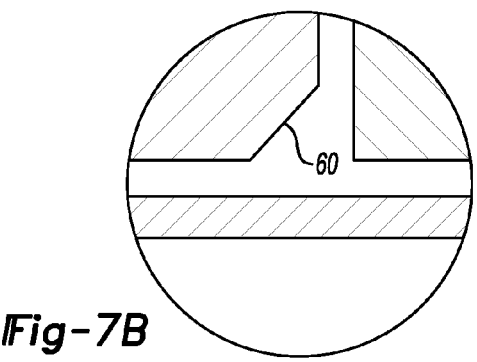
Figure 7C:
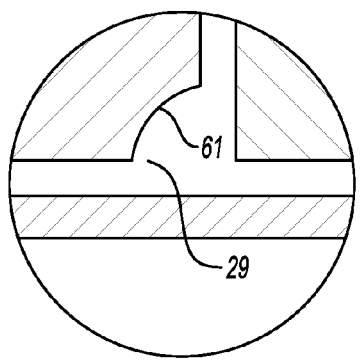
Figure 7D:
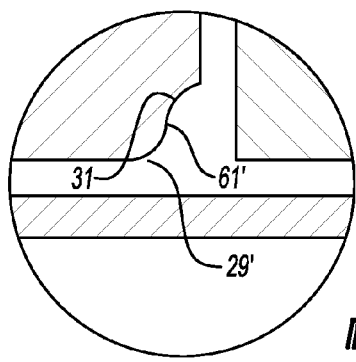

FIG. 7A together with FIGS. 7B-7D is a semi-schematic diagram depicting cutaway views of a portion of an example of a die button 20 according to the present disclosure. FIGS. 7B-7D are detailed views of a cross-section of the relief 54. As shown in FIG. 7B, the relief 54 may include a chamfer 60. In FIG. 7C, the relief 54 is depicted having a curved surface 61 with a relatively sharp radius at a bend-forming edge 29. The curved surface 61 is concave relative to the button body 26. The bend-forming edge 29 is disposed on the aperture 32 where the root portion 56 of the panel 24 bends to allow the tab portion 38 to be displaced from a panel surface 27. In FIG. 7D, the curved surface 61' is a compound curve which blends a rounded bend-forming edge 29' with a concave curve portion 31. It is to be understood that the relief 54 may have any profile that allows the root portion 56 to bend without cracking.

The panel 24, as discussed herein, may be thin sheet metal, or thick sheet metal. In this disclosure, thin sheet metal ranges from about 0.5 mm to about 1.5 mm in thickness. Thick sheet metal ranges in thickness from about 1.5 mm to about 7 mm.

It is to be understood that the panel 24 may include a single layer of material or a plurality of layers. The panel 24 may be formed from a single material, for example steel or aluminum, or from layers of different materials. For example, the panel 24 may include an engineered multilayer composite with a viscoelastic core among layers of metal. An example of the engineered multilayer composite material is QUIET STEEL®. QUIET STEEL® is a registered trademark of Material Sciences Corporation.

Figure 8A:
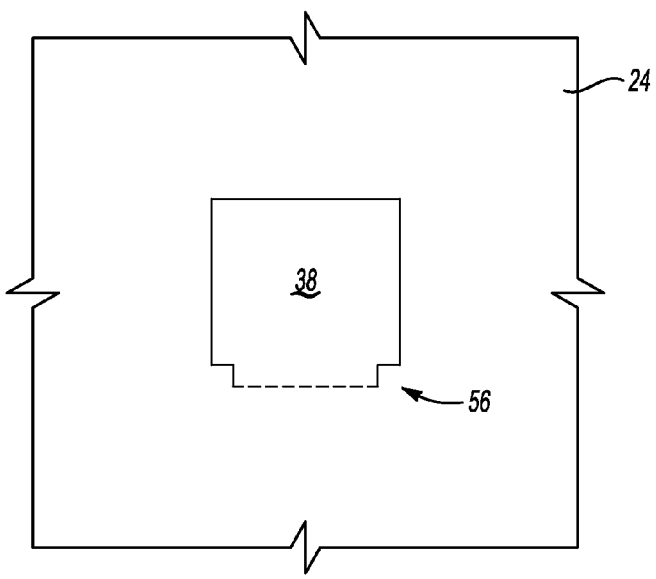
FIGS. 8A and 8B are semi-schematic cutaway diagrams depicting example tab shapes according to the present disclosure.
Figure 8B:
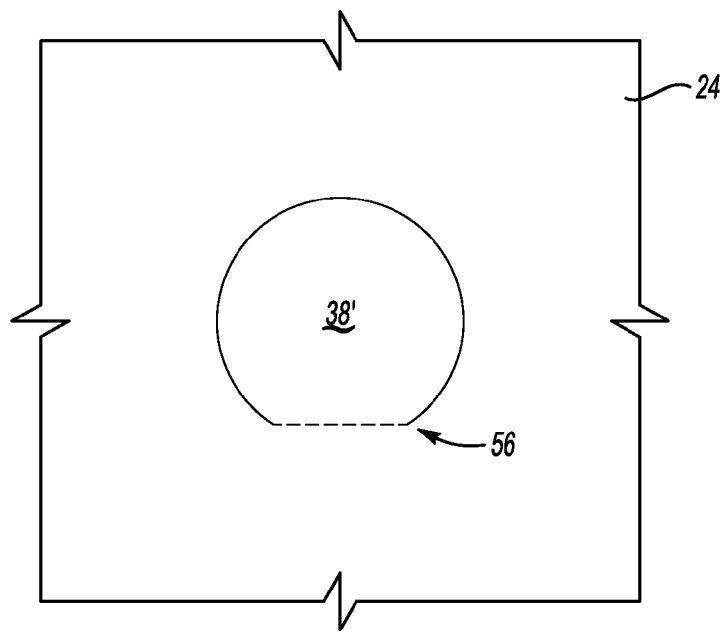

FIGS. 8A and 8B are semi-schematic cutaway diagrams depicting example tab shapes according to the present disclosure. FIG. 8A shows a tab portion 38 resulting from a die button 20 having an aperture 32 that is substantially square in shape. FIG. 8B shows a tab 38' resulting from a die button 20 having an aperture 32 that is substantially round in shape. The root portion 56 is indicated by a dashed line in both FIGS. 8A and 8B. Although the nut 22 would normally be installed during formation of the tab portion 38, 38', the nut 22 is not shown in FIGS. 8A and 8B to more clearly show the shapes of the tab portions 38, 38'.

Figure 9:
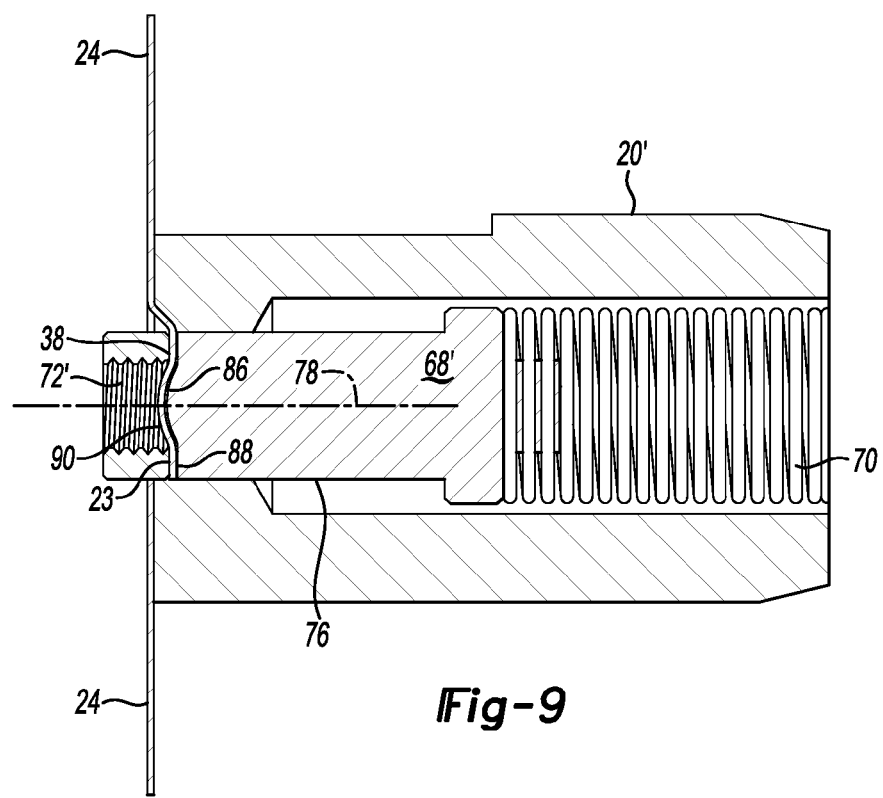
FIG. 9 is a semi-schematic, side cross-sectional view of an example of a nut installed in a panel with a die button according to the present disclosure.

FIG. 9 depicts an example of a die button 20' with a reaction member 68' having a convex curved button 86 on a tab-contacting end 88 of the reaction body 76. The convex curved button 86 may form a dome 90 on the tab portion 38 to contact a bore 72' of the nut 22, thereby substantially blocking a viscous material from entering the bore 72' from an end of the nut 22 having the penetrating face 23.

As used herein, a viscous material has a viscosity greater than molasses at room temperature, about 5 Pa s (Pascal seconds). In some examples, the viscous material may have a viscosity greater than honey at room temperature, about 10 Pa s. Because the material is viscous, the material may be blocked from entering the bore 72' without having tight contact between the tab portion 38 and the bore 72'. In an example, the viscous material may be a thermoset foam based insulation, one example of which is polyurethane insulating foam. In an example, the viscous material may cure and become substantially unable to flow before the material can seep between the tab portion 38 and the nut 22 into the bore 72'.

The present disclosure includes a method of attaching a nut 22 to a panel 24. The method includes maneuvering the panel 24 to contact the die button 20. The method further includes driving a penetrating face 23 of the nut 22 through the panel 24 into the cavity 30 with the punch. The method still further includes shearing the tab portion 38 from the panel 24 during the driving. The method yet still further includes bending the root portion 56 of the panel 24 during the driving to dispose the tab portion 38 into the cavity 30 without severing the root portion 56 from the panel 24. The method still even further includes bending the tab portion 38 over the penetrating face 23 of the nut 22 with the reaction member 68, thereby substantially sealing the bore 72 of the nut 22 with the tab portion 38.

It is to be understood that disclosure of any ranges herein is for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a thickness range from about 0.75 mm to about 4.00 mm should be interpreted to include not only the explicitly recited limits of 0.75 mm to 4.00 mm, but also to include individual thicknesses such as 0.85 mm, 3 mm, etc., and sub-ranges such as from about 0.9 mm to about 3.5 mm, etc. Furthermore, when "about" or "approximately" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it will be apparent to those skilled in the art that the disclosed examples may be modified. Therefore, the foregoing description is to be considered non-limiting.

What is claimed is:

1. A method of attaching a nut to a panel, comprising:
   maneuvering a panel to contact a die button wherein the die button includes:
     a button body having a panel end to be adjacent to the panel;
     a cavity defined in the button body;
     an aperture defined in the panel end at a mouth of the cavity;
     a shearing edge disposed at a perimeter of the aperture to shear a tab portion from the panel when a shearing force is applied to the panel by the nut driven by a punch of a press;
     a relief defined in a portion of the perimeter of the aperture to bend a root portion of the panel connecting the tab portion to the panel without severing the root portion when the nut applies the shearing force to the panel;
     a reaction member slidably disposed within the cavity; and
     a resilient member disposed within the cavity to urge the reaction member toward the panel end;
   driving a penetrating face of the nut through the panel into the cavity with the punch;
   shearing the tab portion from the panel during the driving;
   bending the root portion of the panel during the driving to dispose the tab portion into the cavity without severing the root portion from the panel; and
   bending the tab portion over the penetrating face of the nut with the reaction member, thereby substantially sealing a bore of the nut with the tab portion.

2. The method as defined in claim 1, further comprising screwing a complementary fastener through the bore of the nut, thereby causing the complementary fastener to contact the tab portion and deflect the tab portion away from the bore without severing the root.

3. The method as defined in claim 2 wherein the bore is threaded.

4. The method as defined in claim 2 wherein the bore is unthreaded and the complementary fastener is a self-tapping male fastener.

5. The method as defined in claim 1 wherein the sealing substantially blocks a viscous material from entering the bore from an end of the nut having the penetrating face.

6. The method as defined in claim 5 wherein the material has a viscosity greater than 5 Pascal seconds.

7. The method as defined in claim 5 wherein the material includes thermoset foam based insulation.

8. The method as defined in claim 1, further comprising forming a dome on the tab portion to contact the bore of the nut by forcing a convex curved button on a tab-contacting end of the reaction member into the tab portion, thereby substantially blocking a viscous material from entering the bore from an end of the nut having the penetrating face.

\* \* \* \* \*